3,431,277
METHOD OF PRODUCING EPISULFIDES
Sheldon Herbstman, Spring Valley, N.Y., and Jesse C. H. Hwa, Stamford, Conn., assignors to Stauffer Chemical Company, New York, N.Y., a corporation of Delaware
No Drawing. Filed Jan. 3, 1966, Ser. No. 517,996
U.S. Cl. 260—327                      7 Claims
Int. Cl. C07d 59/00; C07c 149/26

ABSTRACT OF THE DISCLOSURE

A process for preparing an episulfide. The process comprises reacting an organic polysulfide having at least one group consisting of two singly bound carbon atoms, one of which has a halogen atom attached thereto while the other is connected to a chain of at least two sulfur atoms with a base and isolating the so-obtained episulfide.

---

This invention relates to episulfides. More particularly the invention pertains to the preparation of episulfides by treating certain organic polysulfides with a base.

Episulfides constitute a known class of compounds having many valuable and useful properties. They are, for instance, remarkably active entities capable of being transformed into a wide variety of chemical products. A specifically important characteristic is the relative ease with which they undergo polymerization to form poly(alkylenesulfide).

Up to the present time, however, episulfides have not been available in quantities. As a consequence, extensive investigation and developement of the aforesaid compounds has been considerably impeded. Whereas several methods of preparation are known, none of these is entirely satisfactory. Most of the presently used processes give low yields or often require starting materials which are expensive and difficult to handle. One well known procedure requires phosgene, a notoriously poisonous substance. What is needed is an overall synthetic procedure applicable to the manufacture of episulfides generally and at the same time capable of providing optimum yields.

It has now been discovered that episulfides can be obtained by containing under basic conditions an organic polysulfide having at least one group consisting of two singly bound carbon atoms, one of which has a halogen atom attached thereto while the other is connected to a chain of at least two sulfur atoms. For purposes of brevity and convenience the aforedescribed reactant will be referred to herein as a 2-haloethyl polysulfide. The reaction can be schematically portrayed in the following manner:

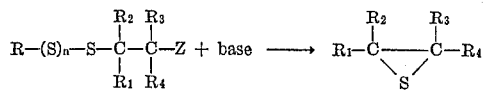

wherein each of $R_1$, $R_2$, $R_3$ and $R_4$ represent a hydrocarbon residue of from 1 to 18 carbon atoms, e.g., methyl, ethyl, ethenyl, n-propyl, propenyl, isobutyl, 2-butenyl, n-pentyl, n-hexyl, isoheptyl, n-octyl, n-nonyl, n-decyl, undecyl, dodecyl, tridecyl, tetradecyl, pentadecyl, hexadecyl, heptadecyl, octadecyl, benzyl, phenethyl, γ-phenylpropyl, cyclopentyl, cyclohexyl, phenyl, anthacyl, naphthyl and the like, while taken together any two of $R_1$, $R_2$, $R_3$ and $R_4$ can form the remainder of a hydrocarbon ring system such as cyclohexane, cyclooctane, cyclooctene, etc., R represents a hydrocarbon residue as above defined for $R_1$, $R_2$, $R_3$ and $R_4$ or

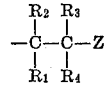

Z is halogen, e.g., chlorine, bromine or iodine and $n$ is an integer, preferably of from 1 to 9.

Although the reaction is essentially independent as to the identity of $R_1$, $R_2$, $R_3$ and $R_4$, those skilled in the art will realize that a certain degree of variation in reaction rate can be expected when using different 2-haloethyl polysulfides. For instance, large or bulky substituents may result in a sterically hindered molecule with the result that a falling off in reaction rate is likely to occur; in extreme instances of crowding the reaction might be retarded to an even greater extent. Certain groups attached to $R_1$, $R_2$, $R_3$ and $R_4$ can also influence reaction rate. However, where such groupings are relatively inert or non-interfering, e.g., ether or halogen moities, the reaction easily proceeds normally.

In carrying out the process of the invention generally satisfactory results are achived by contacting the 2-haloethyl polysulfide with the base. At least one mole equivalent of base is required for each mole equivalent of the 2-haloethyl polysulfide. It thus follows that one mole of episulfide can be produced per mole equivalent of the 2-haloethyl polysulfide. Although as above pointed out, the mole equivalent ratio of 2-haloethyl polysulfide to base is one to one, an excess of either reactant can be employed. Thus, in certain instances it may be desirable to employ an excess of base as where the reactants are somewhat sluggish. That is to say certain of the 2-haloethyl polysulfides are more resistant to basic cleavage than others. Generally speaking it has been our finding that the reaction is conveniently effectuated by heating approximately mole equivalents of the 2-haloethyl polysulfide and base and isolating the so formed episulfide by distillation. However, it is to be understood that the presence of a solvent is not necessary and the reaction can be successfully performed in the absence of any solvent or in certain instances using an excess of the base or 2-haloethyl polysulfide as the reaction media.

The preferred temperature range is from about 100 to about 180°, although the reaction is not limited thereto. Those skilled in the art appreciate that lower temperatures—in the neighborhood of 30° C.—may suffice with the more reactive components whereas less reactive ones may require higher temperatures—in the neighborhood of 250° C.—than the preferred range. A particularly convenient mode of conducting the process of the invention consists in refluxing approximately mole equivalents of the 2-haloethyl polysulfide and base in the presence of a relatively inert, normally liquid polar solvent. Examples of the latter include etherified polyhydric alcohols such as ethylene glycol monomethyl ether, bis(2-ethoxyethyl) ether, bis(2-methoxyethyl) ether, dimethylformamide, dimethylsulfioxide, water and the like.

A number of materials can be used as a base including alkali metal hydroxides, i.e., sodium hydroxide, potassium hydroxide, lithium hydroxide, as well as basic salts, i.e., metal salts of weak acids, preferably alkali metal salts, as exemplified by potassium cyanide, sodium cyanide, potassium acetate, sodium acetate, potassium benzoate, sodium trithiocarbonate, sodium sulfide, silver toluenesulfonate and the like. Other suitable basic materials include organic bases as typified by lower dialkylformamides, e.g., dimethylformamide, diethylformamide, etc., lower dialkyl acetamides, e.g., N,N-dimethylacetamide, tertiary amines, etc. Those familiar with the art will appreciate that other bases not specifically mentioned herein which can be used to effect cleavage of the 2-haloethyl polysulfide to obtain the episulfides in accordance with the process of our invention. As has previously been pointed out, there is some variation in the degree of reactivity of 2-haloethyl polysulfides to basic cleavage.

The 2-haloethyl polysulfides from which the episulfides are obtained by basic cleavage are for the most part known materials, the description and preparation of which can be found in the general chemical literature. Such entities are commonly prepared by reacting an olefin with sulfur monochloride. In some instances, however, the polysulfide intermediates are themselves patentably new compounds as where the requisite two singly bound carbon atoms interposed between the halogen and sulfur chain are part of certain carbocyclic ring systems. In this connection we have prepared dithiobis[2-chlorocycloalkenes] such as dithiobis[2-chlorocyclooctenes] which on basic cleavage according to the process herein engender a new type of 1,2-epithiocycloalkene having the formula

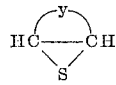

wherein $y$ represents the number of carbon atoms necessary to complete cycloalkene ring of from 4 to 16 carbon atoms.

Reference is now made to the following examples for purpose of illustration, but the inclusion of such examples is not to be taken as placing any limitation on the invention.

EXAMPLE 1 ethylene sulfide

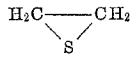

37.5 g. (0.15 mole) of 2-chloroethyl 2-nitrophenyl disulfide and 24.0 g. (0.15 mole) of anhydrous potassium benzoate are added to 150 ml. of bis(2-methoxyethyl) ether (diglyme) and the whole refluxed for a period of fifteen minutes. The reaction is next distilled through a glass column 30 inches by ¾ inch packed with glass helices and provided with a variable take-off head. The fraction boiling in the range 52°–72° C. is fractionated whereby there is obtained 4.6 g. (51%) of ethylene sulfide; B.P. 54°–55° C.; $n_D^{25}$ 1.4924. Its infrared absorption corresponds to that of a known specimen of ethylene sulfide. On polymerization the product forms poly(ethylene sulfide); M.P. 193° C.

EXAMPLE 2

1,2-epithiopropane

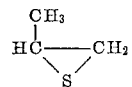

The procedure of Example 1 is repeated but using as components 40.0 g. (0.15 mole) of 2-chloropropyl 2-nitrophenyl disulfide and 24.8 g. (0.15 mole) of anhydrous potassium benzoate in 200 ml. of anhydrous bis(2-methoxyethyl) ether (diglyme). After the reaction is complete, the mixture is subjected to distillation and the material boiling at 56°–135° C. is collected. It is subjected to fractional distillation to yield 3.4 g. (31%) of 1,2-epithiopropane; B.P. 73°–74° C.; $n_D^{24}$ 1.4665.

EXAMPLE 3

1,2-epithiopropane

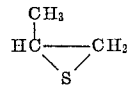

The procedure of Example 2 is repeated except that silver toluenesulfonate is used in placed of anhydrous potassium benzoate.

EXAMPLE 4

1,2-epithiopropane

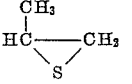

The procedure of Example 2 is repeated but in this instance anhydrous potassium cyanide is used in lieu of anhydrous potassium benzoate.

EXAMPLE 5

Ethylene sulfide

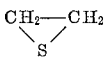

44.0 g. (0.20 mole) of bis(2-chloroethyl) trisulfide and 64.0 g. (0.40 mole) of anhydrous potassium benzoate was added to 200 ml. of anhydrous bis(2-ethoxyethyl) ether and the mixture heated at a temperature of 191°–200° C. over a period of 3 hours. The mixture is subjected to distillation and the material boiling 70°–132° C. collected and fractionated. There is obtained 9.40 g. (42%) of ethylene sulfide.

EXAMPLE 6

Ethylene sulfide

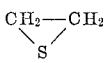

The procedure for this preparation is patterned after that given for Example 1, except that bis(2-chloroethyl) pentasulfide is substituted for bis(2-chloroethyl) disulfide. The yield of purified ethylene sulfide is 8.30 g. (35%).

EXAMPLE 7

1,2-epithiopropane

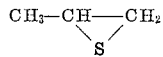

200 ml. of 2 molar sodium trithiocarbonate is introduced dropwise into a reaction vessel containing 52.4 g. (0.185 mole) of bis(2-chloropropyl) tetrasulfide. A continuous steam distillation is effected. The reaction is conducted under a nitrogen atmosphere and the pot temperature maintained at about 130° C. Following addition of the trithiocarbonate solution, water is added to the reaction vessel and the steam distillation continued until the distillate contains little or no organic phase. About 300–500 ml. of aqueous distillate is collected which is then extracted with 300 ml. of xylene. The extracts are dried and then subjected to fractional distillation. There is obtained 11.5 g. (42%) of purified 1,2-epithiopropane.

EXAMPLE 8

1,2-epithiopropane

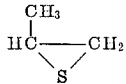

The procedure of Example 7 is repeated but substituting sodium hydroxide for sodium trithiocarbonate. In general the results and yields are comparable to Example 7.

EXAMPLE 9

Ethylene sulfide

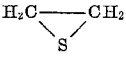

The procedure of Example 7 is repeated except that equivalent quantities of sodium hydroxide and bis(2-chloroethyl) trisulfide are used in lieu of sodium trithiocarbonate and bis(2-chloropropyl) tetrasulfide. The yield of ethylene sulfide amounts to 33%.

EXAMPLE 10

1,2-epithiocyclooctane

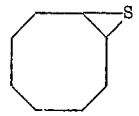

A solution of sodium hydroxide obtained by dissolving 28.0 g. (0.70 mole) of solid sodium hydroxide in 500 ml. of water is added dropwise into a stirred reactor containing 105.5 g. (0.294 mole) of the reaction product of cyclooctene and sulfur monochloride. The addition requires 2.5 hours during which time the pot temperature is maintained at 110°–121° C. and reaction continuously steam distilled to remove all volatile organic components. After cooling, the aqueous distillate is extracted with ether, the extracts dried and then fractionally distilled. The purified 1,2-epithiocyclooctane boiling at 51°–53° C. at 0.40 mm. compares with an authentic sample.

The reaction product of cyclooctene and sulfur monochloride is prepared as follows. 135 g. (1.0 mole) of sulfur monochloride is added to a solution of 224 g. (2.0 mole) of cyclooctene in 300 ml. of ethylene chloride while maintaining the pot temperature between 0°–10° C. The resulting adduct after distillation of solvent is then used without further purification as an intermediate for preparing 1,2-epithiocyclooctane.

EXAMPLE 11

1,2-epithiocyclohexane

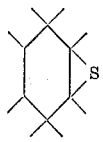

A solution of sodium hydroxide prepared from 36.0 g. (0.90 mole) and 250 ml. of water is added dropwise to a stirred reactor containing 130 g. (0.36 mole) of the reaction product of sulfurized sulfur monochloride-cyclohexene (equivalent to cyclohexene tetrasulfide) as the volatile organics are continuously steam distilled out of the reaction zone. The time of addition is about one hour and 10 minutes while maintaining the pot temperature at 105°–115° C. and a pressure at 30–40 mm. The aqueous distillate is extracted with ether, the ether extracts dried and fractionated. There is obtained 22.5 g. (29%) of purified cyclohexene sulfide boiling at 35°–39° C. at 0.30 mm.

The sulfurized sulfur monochloride cyclohexene adduct is obtained by reacting one mole of sulfur monochloride with two moles of cyclohexene in the presence of ethylene chloride as a solvent. After distillation of solvents the resulting adduct, which corresponds to bis(2-chlorocyclohexyl)disulfide, is sulfurized by heating with two moles of finely powdered sulfur for about 20 hours at 130°–140° C. The resulting polysulfide corresponds to bis(2-chlorocyclohexyl) tetrasulfide by elemental analysis.

EXAMPLE 12

5,6-epithiocyclooctene-1

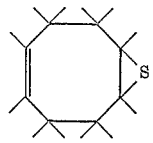

To 75.0 g. (0.21 mole) of the reaction product of sulfur monochloride and 1,5-cyclooctadiene is added a solution of 24.0 g. (0.42 mole) of potassium hydroxide in 200 ml. of water. The reaction temperature and rate of addition is adjusted whereby the episulfide, as soon as it had formed, would steam distill from the reaction zone. The temperature range is about 110°–121° C. After all the organic material is removed, the cooled distillate is extracted with ether, dried and fractionated. The portion boiling 70°–74° C. at 0.50 mm. is collected. The yield of purified product is 6.5 g. (12%) $n_D^{24}$ 1.5535. The structure of the episulfide is confirmed by elemental and infrared analysis.

The product of 1,5-cyclooctadiene and sulfur monochloride is obtained by reacting 135 g. (1.0 mole) of sulfur monochloride and 220 g. (2.0 mole) of 1,5-cyclooctadiene in 300 ml. of ethylene chloride at about 0°–10° C. In general, the procedure for obtaining the sulfur monochloride 1,5-cyclooctadiene adduct is patterned after the preparation of the sulfur monochloride cyclohexene adduct described in Example 11.

EXAMPLE 13

Polymerization of 5,6-epithiocyclooctene-1

1.0 g. of 5-cycloocetene sulfide and 0.01 g. of anhydrous zinc carbonate are heated at about 100° C. for 4 hours under nitrogen. During this time the colorless mobile liquid is converted to a viscous yellow oil. The structure of the polysulfide is ascertained by infrared analysis.

We claim:

1. A method of preparing an episulfide which comprises reacting an organic polysulfide having at least one group consisting of two singly bound carbon atoms, one of which has a halogen atom attached thereto while the other is connected to a chain of at least two sulfur atoms with a base at a temperature between about 30° C. and about 250° C. and isolating the so-obtained episulfide.

2. A method of preparing an episulfide of the formula:

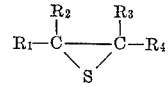

wherein $R_1$, $R_2$, $R_3$ and $R_4$ are each selected from the class consisting of hydrogen and a hydrocarbon radical of from 1 to 18 carbon atoms free of interfering substituents, which comprises contacting a compound of the formula:

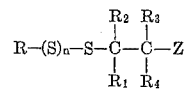

wherein R is a hydrocarbon radical of from 1 to 18 carbon atoms free of interfering substituents and

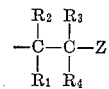

n is an integer and Z is a halogen, with a base at a temperature between about 100° C. and about 180° C. and isolating the so-obtained episulfide.

3. The process according to claim 1 wherein the reaction is conducted at a temperature between about 100° C. and about 250° C.

4. The process according to claim 1 wherein the reaction is carried out in the presence of a normally liquid relatively inert polar solvent.

5. The process according to claim 1 wherein the base is an alkali metal hydroxide.

6. The process according to claim 1 wherein the base is the alkali metal salt of a weak acid.

7. The process according to claim 1 wherein the episulfide is isolated by distillation from the reaction mixture.

References Cited

UNITED STATES PATENTS 3,222,325  12/1965  Brodoway _____ 260—327

OTHER REFERENCES

Van Tamelen: Jour. Amer. Chem. Soc., vol. 73 (1951), pp. 3445–6.

Danehy et al.: Jour. Amer. Chem. Soc., vol. 83 (1961), pp. 1109–12.

JAMES A. PATTEN, *Primary Examiner.*